US008570779B2

(12) United States Patent
Dommaschk et al.

(10) Patent No.: US 8,570,779 B2
(45) Date of Patent: Oct. 29, 2013

(54) METHOD FOR LIMITING DAMAGE TO A CONVERTER HAVING POWER SEMICONDUCTORS IN THE CASE OF A SHORT CIRCUIT IN THE DC VOLTAGE INTERMEDIATE CIRCUIT

(75) Inventors: Mike Dommaschk, Guteborn (DE); Jörg Dorn, Buttenheim (DE); Ingo Euler, Erlangen (DE); Jörg Lang, Stadtsteinach (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 967 days.

(21) Appl. No.: 12/531,076

(22) PCT Filed: Mar. 13, 2007

(86) PCT No.: PCT/DE2007/000485
§ 371 (c)(1),
(2), (4) Date: Oct. 15, 2009

(87) PCT Pub. No.: WO2008/110129
PCT Pub. Date: Sep. 18, 2008

(65) Prior Publication Data
US 2010/0085785 A1    Apr. 8, 2010

(51) Int. Cl.
*H02H 7/125* (2006.01)
(52) U.S. Cl.
USPC ............................... 363/53; 361/57
(58) Field of Classification Search
USPC .................. 363/50–54, 125–129; 361/54–57; 323/901
See application file for complete search history.

(56) References Cited

U.S. PATENT DOCUMENTS

| | | | |
|---|---|---|---|
| 5,889,667 A * | 3/1999 | Bernet | 363/127 |
| 6,040,988 A | 3/2000 | Rees et al. | |
| 6,411,529 B1 | 6/2002 | Svensson | |
| 2004/0027734 A1 * | 2/2004 | Fairfax et al. | 361/2 |
| 2007/0297202 A1 * | 12/2007 | Zargari et al. | 363/50 |
| 2008/0232145 A1 | 9/2008 | Hiller et al. | |

FOREIGN PATENT DOCUMENTS

| | | |
|---|---|---|
| DE | 19736903 A1 | 3/1999 |
| DE | 10323220 A1 | 12/2004 |
| JP | 8009647 A | 1/1996 |
| JP | 2003500989 A | 1/2003 |
| RU | 2269196 C1 | 1/2006 |
| WO | 0070737 A1 | 11/2000 |
| WO | 2007023064 A1 | 3/2007 |

* cited by examiner

*Primary Examiner* — Harry Behm
*Assistant Examiner* — Matthew Grubb
(74) *Attorney, Agent, or Firm* — Laurence A. Greenberg; Werner H. Stemer; Ralph E. Locher

(57) ABSTRACT

A device for converting an electric current has a phase module, which in turn has an alternating current connection and at least one direct current connection connected to an intermediate direct current circuit. The device further has an energy accumulator. A phase modulation path is formed between each direct current connection and each alternating current connection. Each phase modulation path has a series connection of submodules, which each have a power semiconductor. A semiconductor protective device is provided in parallel connection to power semiconductors of each submodule. A control unit actuates the semiconductor protective device, and energy accumulator(s) are equipped for supplying energy to the control unit. The device safely prevents damage from a short circuit on the direct-current side, even when the supply grid is connected, because a direct current connection of each phase module is connected to the intermediate direct current circuit via a direct-current switch.

1 Claim, 9 Drawing Sheets

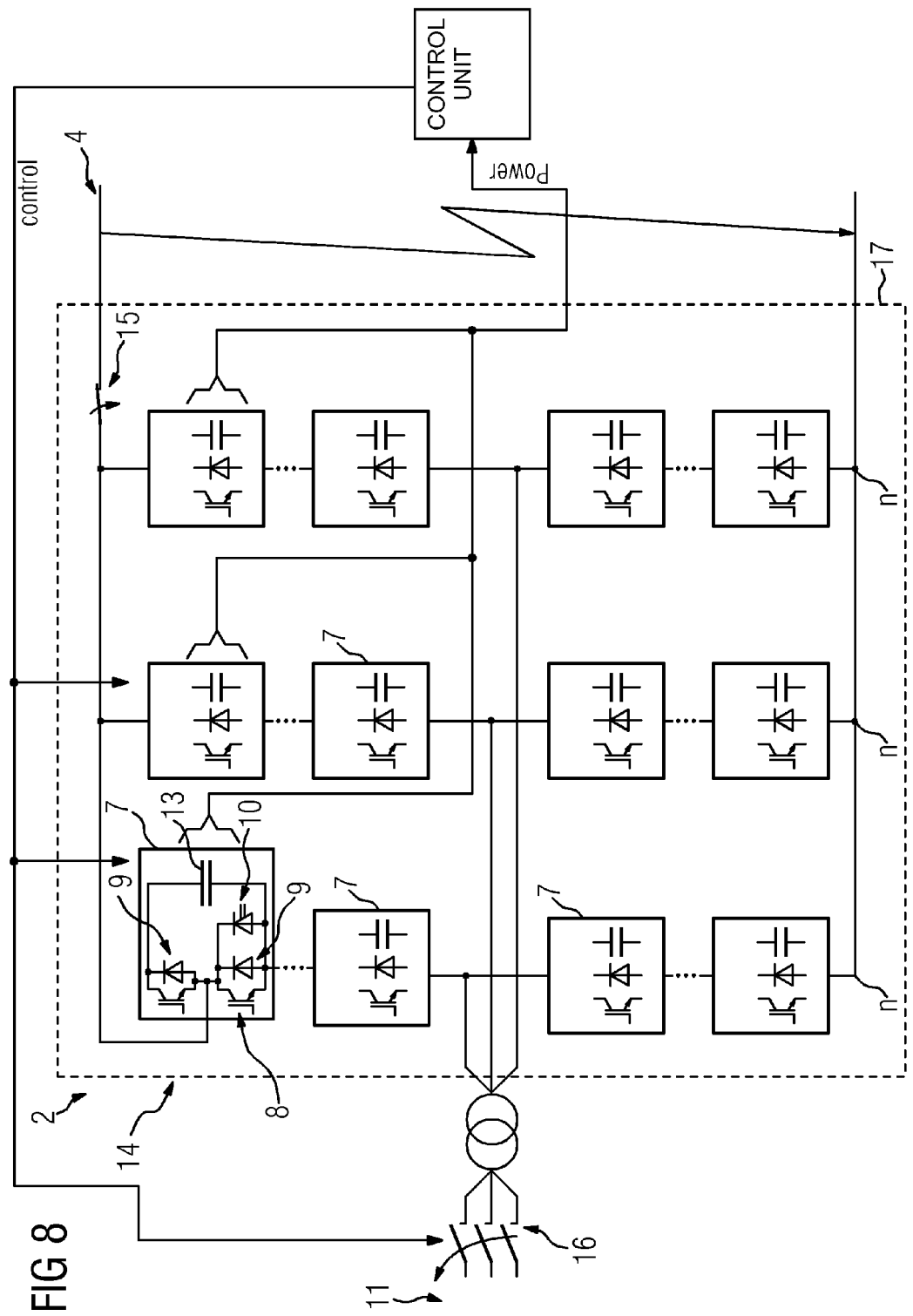

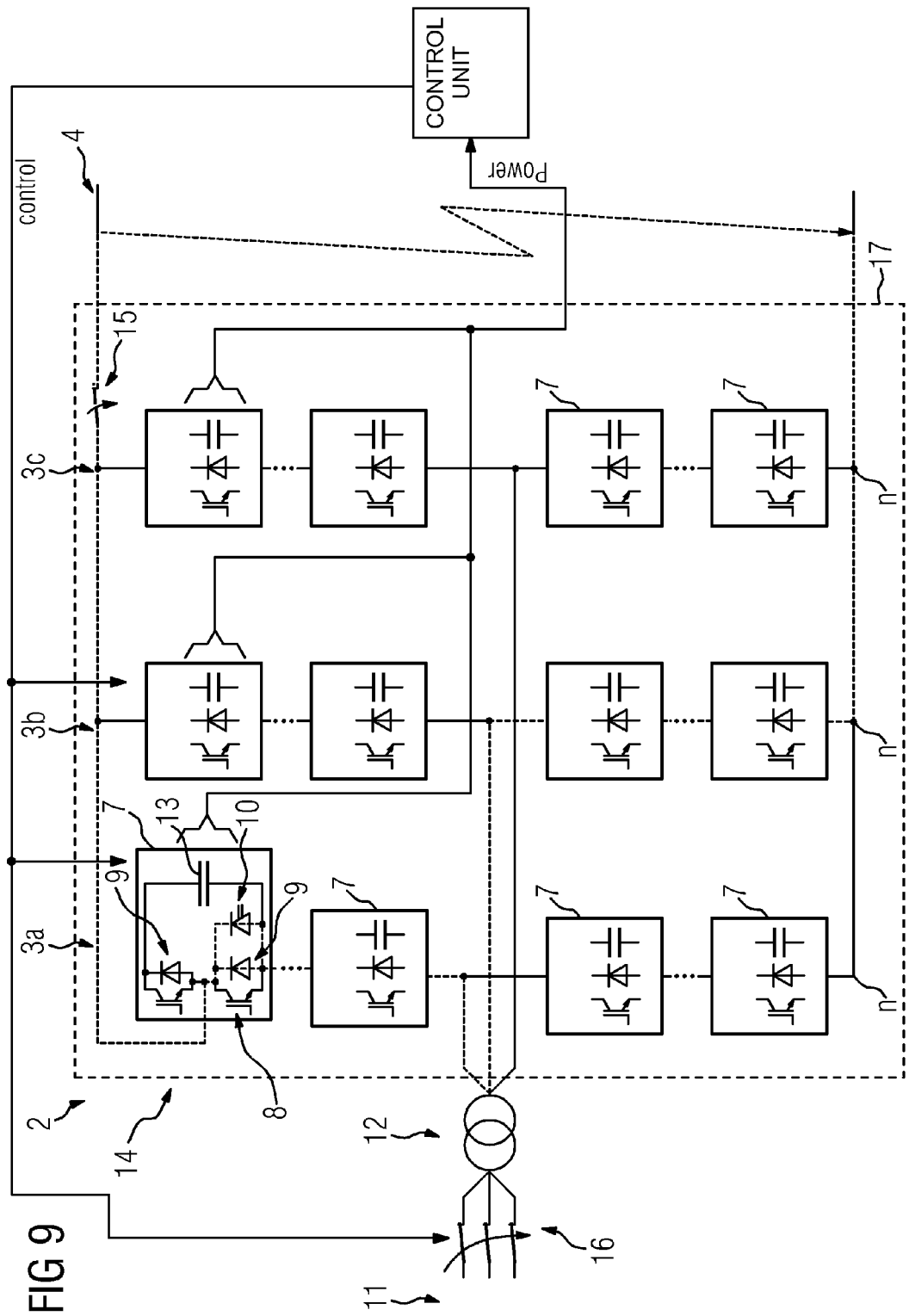

METHOD FOR LIMITING DAMAGE TO A CONVERTER HAVING POWER SEMICONDUCTORS IN THE CASE OF A SHORT CIRCUIT IN THE DC VOLTAGE INTERMEDIATE CIRCUIT

BACKGROUND OF THE INVENTION

Field of the Invention The invention relates to a device for converting an electric current comprising at least one phase module having an AC voltage connection and at least one DC voltage connection, connected to a DC voltage intermediate circuit, and comprising at least one energy store, wherein a phase module branch is formed between each DC voltage connection and each AC voltage connection, and wherein each phase module branch has a series circuit formed by submodules each having at least one power semiconductor, wherein semiconductor protective means connected in parallel with one of the power semiconductors of each submodule and a control unit for driving the semiconductor protective means are provided and the energy store or energy stores is/are designed for supplying energy to the control unit.

The invention furthermore relates to a method for limiting damage to a converter having power semiconductors, said converter being connected to at least one further converter or at least one electrical machine via a DC voltage intermediate circuit affected by a short circuit.

The device of the generic type is already known from DE 103 23 220 A1, which discloses a so-called multiterminal converter for connection to an energy-feeding three-phase supply system. The previously known converter has phase modules, the number of which corresponds to the number of supply system phases to be connected. Each phase module has one AC voltage connection and two DC voltage connections, wherein the DC voltage connections of the phase modules are connected to a DC voltage intermediate circuit. Phase module branches extend between each AC voltage connection and each DC voltage connection, wherein each phase module branch comprises a series circuit of submodules. Each submodule has a dedicated energy store connected in parallel with a power semiconductor circuit. The power semiconductor circuit has turn-off power semiconductors, such as IGBTs, GTOs or the like, with each of which a respective freewheeling diode is reverse-connected in parallel. If a short circuit is present in the DC voltage circuit, the energy stores of the respective submodule are discharged. In order to avoid destruction of the power semiconductors of the submodules, each power semiconductor jeopardized by a short circuit in the DC voltage circuit has connected in parallel with it a semiconductor protective means, e.g. a thyristor, which is triggered in the case of a short circuit and subsequently carries a large part of the short-circuit current. What is disadvantageous about the previously known solution is that the triggering unit that triggers the thyristor is supplied with energy by the energy store of the submodules. Although this obviates a separate energy supply of the triggering units, the energy stores of the submodules are not yet charged when the converter is connected to the three-phase system, with the result that a triggering of the thyristors is impossible. Consequently, when the supply system is connected in, destruction of the power semiconductors of the previously known converter cannot be ruled out if a short circuit is present in the DC voltage circuit.

BRIEF SUMMARY OF THE INVENTION

It is an object of the invention therefore, to disclose a device and a method of the type mentioned in the introduction wherein damage on account of a short circuit present on the DC voltage side is reliably prevented including when the supply system is connected in.

Proceeding from the device mentioned in the introduction, the invention achieves this object in that at least one DC voltage connection of each phase module is connected to the DC voltage intermediate circuit via a DC voltage switch.

The invention furthermore achieves said object by means of a method for limiting damage to a converter having power semiconductors, said converter being connected to other converters or other electrical machines via a DC voltage intermediate circuit affected by a short circuit, wherein a drive unit is supplied with energy by an energy store of the converter or of the DC voltage intermediate circuit, the drive unit ascertains a short circuit and subsequently drives at least one semiconductor protective means connected in parallel with a power semiconductor, such that a short-circuit current flows both via the semiconductor protective means and via the power semiconductor connected in parallel therewith, wherein each energy store is charged before the converter is connected to the DC voltage intermediate circuit.

According to the invention, each energy store of the device is firstly charged before the AC voltage system is switched on or connected in, and is connected to the DC voltage intermediate circuit only after the charging of the energy stores.

In order to prevent the current flow in the case of a short circuit, the device according to the invention expediently has a DC voltage switch, via which at least one DC voltage connection of each phase module is connected to the DC voltage circuit. The DC voltage switch has a disconnected position, in which a current flow via the DC voltage switch is prevented, and a contact position, in which a current flow via the DC voltage switch is enabled. If the DC voltage switch is in its disconnected position, therefore, each energy store of the DC voltage intermediate circuit or each energy store of each submodule can firstly be charged. After the charging of the energy stores, the AC voltage system is disconnected again from the converter. Only then is the DC voltage intermediate circuit connected by means of a DC voltage switch being transferred to its contact position, wherein, in the case of a short circuit in the DC voltage intermediate circuit and after the AC voltage system has been connected in again, the charged energy stores provide the energy necessary for triggering the one or more semiconductor protective means. The DC voltage switch is advantageously a mechanical disconnecting switch.

Advantageously, each AC voltage connection is connected to a supply system via an AC voltage switch. The AC voltage switch enables the supply system to be connected in particularly simply, wherein the AC voltage switch likewise has two switch positions, namely a disconnected position and a contact position. The supply system is connected to the converter by means of the AC voltage switch being transferred from its disconnected position to its contact position, such that the energy store or energy stores is or are charged with the DC voltage switch "open". The AC voltage switch is expediently a mechanical circuit-breaker.

The semiconductor protective means expediently comprise at least one thyristor. Thyristors can be obtained cost-effectively and have a sufficiently high surge current strength, such that the affected thyristor, even in the case of rapidly rising and high short-circuit currents which occur when the AC voltage system is turned on, in response to a short circuit in the DC voltage circuit, until the AC voltage switch is opened again, is not destroyed by the resulting short-circuit current.

Expediently, each submodule comprises a turn-off power semiconductor with a freewheeling diode connected in the opposite sense thereto, wherein each energy store is arranged in the DC voltage intermediate circuit. Converters having such a central energy store are used in the field of energy transmission and distribution. However, in general a high quantity of energy is stored in the central energy store, and is released in said case of a short circuit. In the context of the invention, the arrangement or interconnection of the central energy store with respect to the DC voltage switch is provided such that charging or discharging of the energy store is made possible even with the DC voltage switch open. Therefore, as viewed from the DC voltage connections of the phase modules, the DC voltage switch is consequently connected downstream of the connection terminal of the energy store. In other words, the central energy store is connected into the DC voltage intermediate circuit between the DC voltage connections of the phase modules and the DC voltage switch in parallel with the phase modules.

In a departure from this, each submodule has an energy store and a power semiconductor circuit connected in parallel with the energy store. Such a device is also referred to as a so-called multilevel converter since, instead of one central large energy store, a plurality of smaller energy stores connected in series with one another are provided, which are in each case connected in parallel with a power semiconductor switch.

In accordance with an expedient further development in this respect, the power semiconductor circuit is a full-bridge circuit. With the aid of the full-bridge circuit it is possible to impress the capacitor voltage, a so-called zero voltage or the inverted capacitor voltage on the two connection terminals of the bipolar submodules which are connected in series.

In a departure from this, the power semiconductor circuit comprises two turn-off power semiconductors connected in series with one another, each power semiconductor having a respective freewheeling diode connected in parallel with it in the opposite sense. Such a power semiconductor circuit is also referred to as a so-called Marquardt circuit, which is disclosed in DE 101 03 031 A1 and which by this reference is intended to be part of the disclosure given here. In contrast to the full-bridge circuit, the power semiconductor circuit according to Marquardt has only two power semiconductors connected in series with one another, the latter being connected up to the energy store of the respective submodule in such a way that either the voltage dropped across the energy store of the respective submodule is dropped across the two connection terminals of the submodule, or a zero voltage. An inversion of the voltage dropped across the energy store at the submodule terminals is not made possible by the Marquardt circuit. However, the Marquardt circuit is more cost-effective than the full-bridge circuit.

In accordance with an expedient further development of the method according to the invention, each power semiconductor is connected to the DC voltage intermediate circuit by means of a DC voltage switch. In this way, by means of mechanical circuit-breakers, disconnecting switches or the like, or alternatively by means of electronic switches comprising semiconductors, such as, for example, thyristors, IGBTs or the like, it is possible to disconnect the DC voltage intermediate circuit from the converter. What is essential here is that all the energy stores are connected to the DC voltage intermediate circuit via the DC voltage switch.

The converter, the energy stores and the DC voltage switch are advantageously arranged in a common housing.

Expediently, each DC voltage switch is opened before the converter is connected to a supply system. With the DC voltage switch open, the energy stores can be charged in order to provide the energy necessary for triggering the semiconductor protective means.

Advantageously, the converter is connected to a supply system by means of an AC voltage switch. As has already been explained, this further development of the invention opens up the highest possible flexibility when charging the energy stores, a cost-effective solution simultaneously being provided with the aid of a mechanical switch. However, here as well, an electronic switch comprising power semiconductors can be provided instead of a mechanical switch.

Expediently, in order to connect the converter to the DC voltage intermediate circuit firstly all the AC voltage switches and all the DC voltage switches are opened, and afterward, in order to charge the energy stores, the AC voltage switch is closed, finally each AC voltage switch is opened after the charging of the energy stores, the DC voltage switch is closed in order to connect the converter to the DC voltage intermediate circuit, and, finally, each AC voltage switch is closed in order to connect the converter to the AC voltage system provided that no DC short circuit was able to be detected beforehand. On the basis of this simple switching sequence, a cost-effective possibility is provided for charging the energy stores of the device before a high short-circuit current owing to a short-circuit in the DC voltage intermediate circuit driven by the AC voltage system flows via the power semiconductors of the device, with the result that a necessary energy is provided for driving semiconductor protective means.

Further expedient configurations and advantages of the invention are the subject matter of the following description of exemplary embodiments of the invention with reference to the accompanying figures of the drawing, wherein identical reference symbols refer to identically acting component parts, and wherein

BRIEF DESCRIPTION OF THE SEVERAL VIEWS OF THE DRAWING

FIG. 8 shows the device in accordance with FIGS. 4 and 6 in a different switch position, FIG. 9 shows a device in accordance with FIGS. 4, 6 and 8 in a further switch position.

DESCRIPTION OF THE INVENTION

Figure 1:
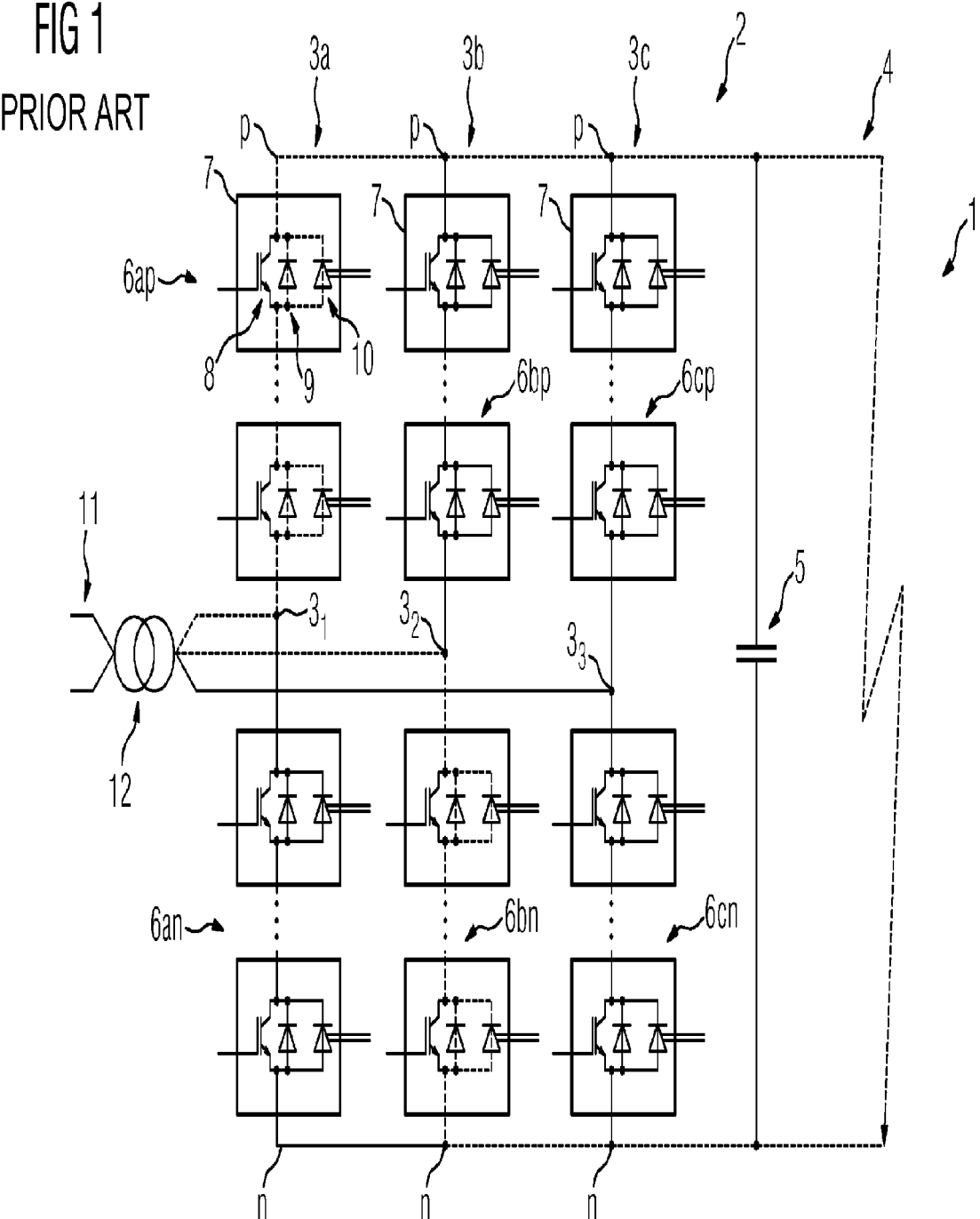
FIG. 1 shows a device in accordance with the prior art.

FIG. 1 shows a device 1 in accordance with the prior art. The previously known device 1 comprises a converter 2 composed of three phase modules 3a, 3b and 3c. Each phase module 3a, 3b and 3c has one AC voltage connection $3_1$, $3_2$ and $3_3$, respectively, and two DC voltage connections, which are in each case designated by p and n. The DC voltage connections p and n respectively form the poles of a DC voltage intermediate circuit 4, wherein a central capacitor 5 as an energy store extends between the two poles p and n in parallel connection. Phase module branches 6*ap*, 6*bp*, 6*cp* and respectively 6*an*, 6*bn* and 6*cn* extend between each AC voltage connection $3_1$, $3_2$ and $3_3$ and each DC voltage connection p and respectively n of a phase module 3*a*, 3*b* and respectively 3*c*. Each of said phase module branches is composed of a series circuit of submodules 7 which are constructed identically. In the exemplary embodiment illustrated in FIG. 1, each submodule 7 has a turn-off power semiconductor 8, for example an IGBT, a GTO or the like, and a freewheeling diode 9 connected in parallel therewith in the opposite sense. Furthermore, a thyristor 10 that can be driven in the case of a short circuit is connected in parallel with the freewheeling diode 9 in the same sense. If a short circuit is present in the DC voltage intermediate circuit 4, the short-circuit current indicated by dashed lines is formed. It can be seen that the short-circuit current is fed from a supply system 11—only indicated schematically—via a transformer 12 for connecting the device 1 according to the invention to the supply system 11. In this case, in the exemplary embodiment shown, the short-circuit current flows via the freewheeling diodes 9 of the submodules and also via the semiconductor protective means 10 connected in parallel with the freewheeling diode 9, that is to say the triggered thyristor. However, a triggering energy is necessary for triggering the thyristor, said triggering energy being provided by the central capacitor 5. The central capacitor 5 is charged by the supply system 11. If a short circuit is present in the DC voltage intermediate circuit 4 as early as when the supply system 11 is connected in for the first time, the thyristor 10 cannot be transferred to its on-state position, as shown in FIG. 1, such that the short-circuit current established is distributed between both the freewheeling diode 9 and the thyristor 10. Rather, solely the freewheeling diode 9 then carries the short-circuit current, such that the destruction of the submodules 7 and possibly of the entire converter 2 can occur.

Figure 2:
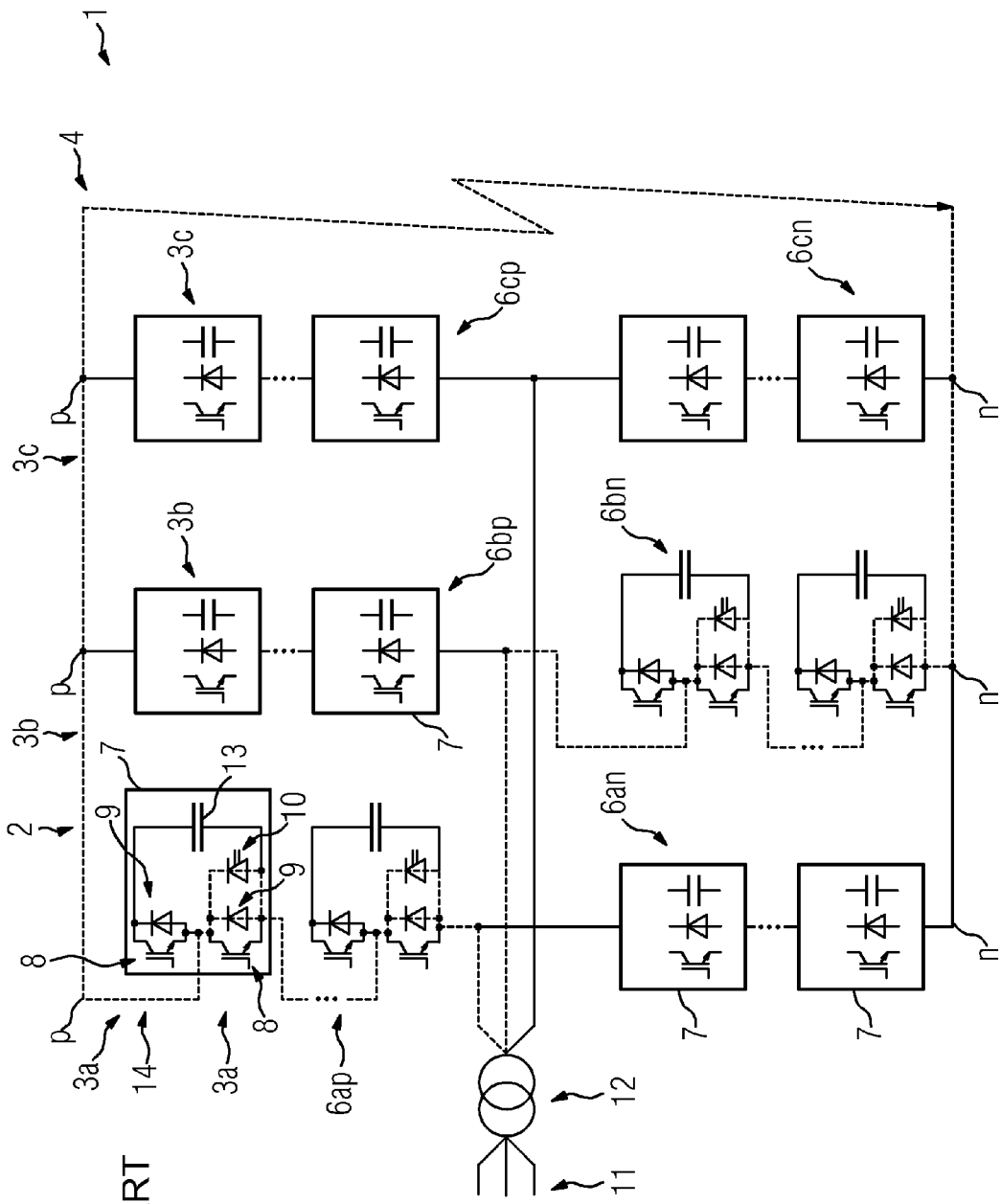
FIG. 2 shows a further device in accordance with the prior art.

FIG. 2 shows a device 1 in accordance with the prior art, wherein the converter 2 is configured as a so-called multilevel converter, however. In contrast to the device in accordance with FIG. 1, the device in accordance with FIG. 2 no longer has a central energy store in the DC voltage intermediate circuit 4. Rather, each submodule 7 comprises a dedicated energy store 13 in the form of a unipolar capacitor. The capacitor 13 is connected in parallel with a power semiconductor circuit 14, which in this case comprises two turn-off power semiconductors 8, such as, for example, IGBTs, GTOs or the like, connected in series with one another.

Each of said turn-off power semiconductors 8 has a freewheeling diode 9 connected in parallel with it in the opposite sense. If a short circuit is present in the DC voltage intermediate circuit 4, a short-circuit current fed from the supply system 11 flows, the path of said short-circuit current being depicted by dashed lines in FIG. 2. It can be seen that the short-circuit current flows via one of the freewheeling diodes 9 of the power semiconductor circuit. A semiconductor protective means in the form of a thyristor 10 is connected in parallel only with this freewheeling diode 9. As a result of the triggering of the thyristor 10, the short-circuit current flows both via the thyristor 10 and via said freewheeling diode 9, wherein the thyristor 10 and the freewheeling diode 9 are dimensioned in such a way that a sufficiently high current-carrying capacity is provided in order to withstand the short-circuit currents that arise. What is disadvantageous here as well, however, is that the triggering electronics (not illustrated pictorially) are supplied with energy for triggering the thyristor 10 by the capacitor 13 of each submodule 7. Before the supply system 11 is connected, however, the capacitor 13 is not charged, such that the thyristor 10 cannot be triggered while the supply system 11 is being connected in. Therefore, if a short circuit is present in the DC voltage intermediate circuit 4 when the supply system 11 is connected in, said short circuit flows solely via one of the freewheeling diodes 9 of the submodules 7, such that the destruction of said freewheeling diode 9 can occur. Said diode is generally combined with the turn-off power semiconductor 8 to form a component, however, such that this leads to the destruction of the entire power semiconductor circuit 14.

Figure 3:
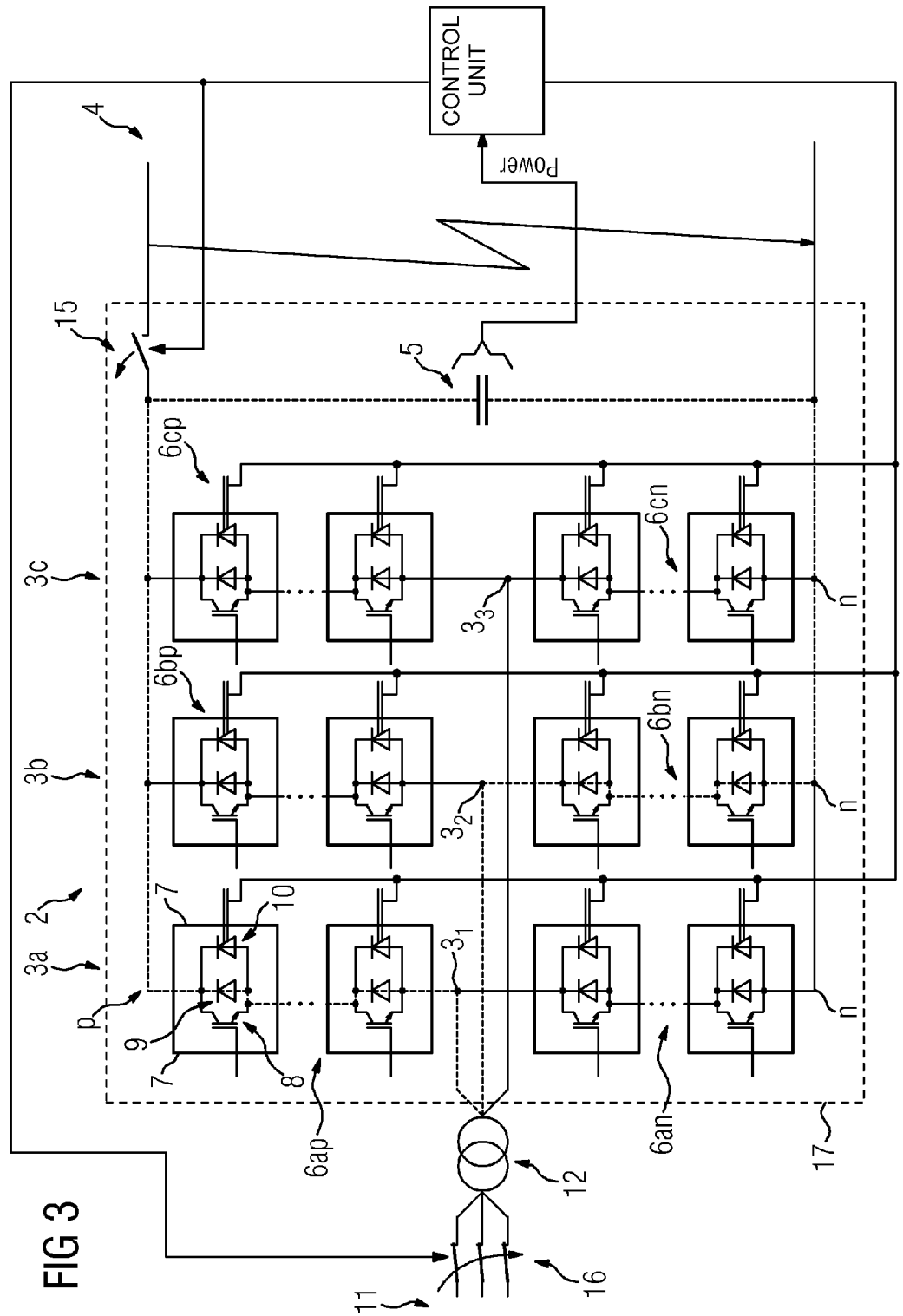
FIG. 3 shows an exemplary embodiment of the device according to the invention.

FIG. 3 shows a device 14 according to the invention, which device is constructed in a manner corresponding to FIG. 1, wherein each submodule 7 comprises a turn-off power semiconductor 8 and a freewheeling diode 9 connected in parallel therewith in the opposite sense. Each freewheeling diode 9 has a thyristor 10 connected in parallel with it in the same sense. The DC voltage intermediate circuit 4 again has a central capacitor 5 between the positive pole p and the negative pole n of the DC voltage intermediate circuit 4. In contrast to the previously known device in accordance with FIG. 1, the exemplary embodiment according to the invention in accordance with FIG. 3 has a DC voltage switch and also an AC voltage switch 16, which is arranged between the supply system 11 and the transformer 12. What is furthermore essential is that that connection terminal of the capacitor 5 which is connected to the positive pole of the DC voltage intermediate circuit 4 is arranged between the DC voltage connections p of the phase modules 3*a*, 3*b* and 3*c* and the DC voltage switch 15.

The DC voltage switch 15, the capacitor 5 and the phase modules 3*a*, 3*b* and 3*c* are arranged in a valve hall 17, which is customary in the construction of a so-called high-voltage direct-current transmission installation.

In FIG. 3, the DC voltage switch 15 is in its disconnected position, in which a current flow via the DC voltage switch 15 is prevented. By contrast, the AC voltage switch 16 is in its contact position, such that the supply system 11 is electrically connected to the converter 2 arranged in the valve hall 17. However, the open DC voltage switch 15 prevents a current flow via the DC voltage intermediate circuit 4 affected by a short circuit. The central capacitor 5 can be charged, however, with the supply system 11 connected in. The current path for charging the capacitor 5 is illustrated by dashed lines in FIG. 3. It can be seen that the charging current flows via the freewheeling diodes 9 of the submodules 7.

Figure 4:
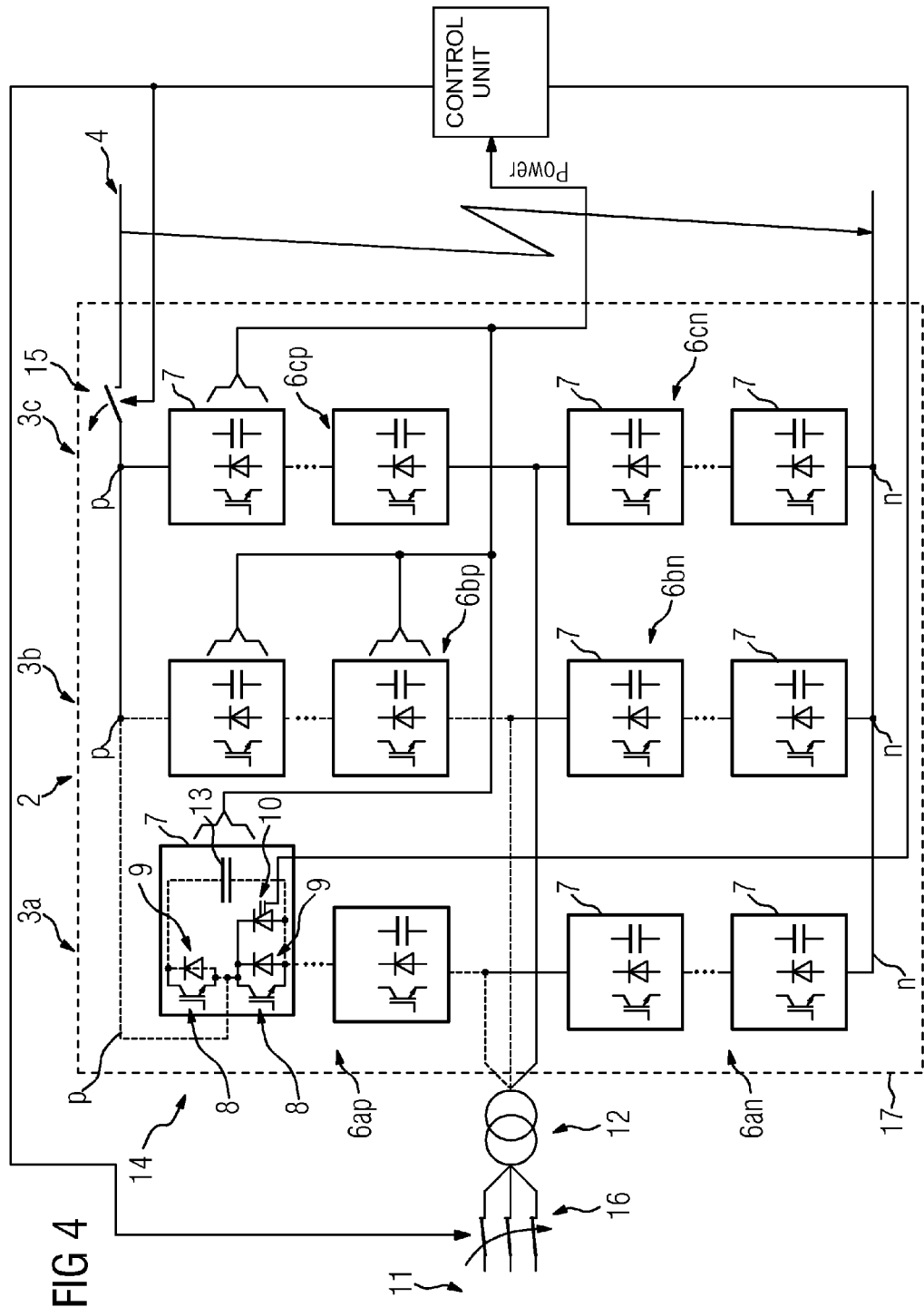
FIG. 4 shows a further exemplary embodiment of a device according to the invention.

FIG. 4 again shows a so-called multilevel converter 14, the construction of which corresponds to that of the converter in accordance with FIG. 2. However, the exemplary embodiment according to the invention furthermore again comprises a DC voltage switch 15, via which the DC voltage connections p of the phase modules 3*a*, 3*b* and respectively 3*c* are connected to the DC voltage intermediate circuit 4. Furthermore, the supply system 11 is again connected via an AC voltage switch 16 to the transformer and hence to the converter 2. As in FIG. 3, the DC voltage switch 15 is in its disconnected position, the AC voltage switch 16 being in its contact position. As in FIG. 3, in the case of a multilevel converter 14 in accordance with FIG. 4 as well, in the case of this switch position, the charging of the capacitors 13 of each submodule 7 occurs, the charging current path again being illustrated by dashed lines. It can be seen that the charging current flows via that freewheeling diode 9 which has no thyristor 10 connected in parallel with it.

Figure 5:
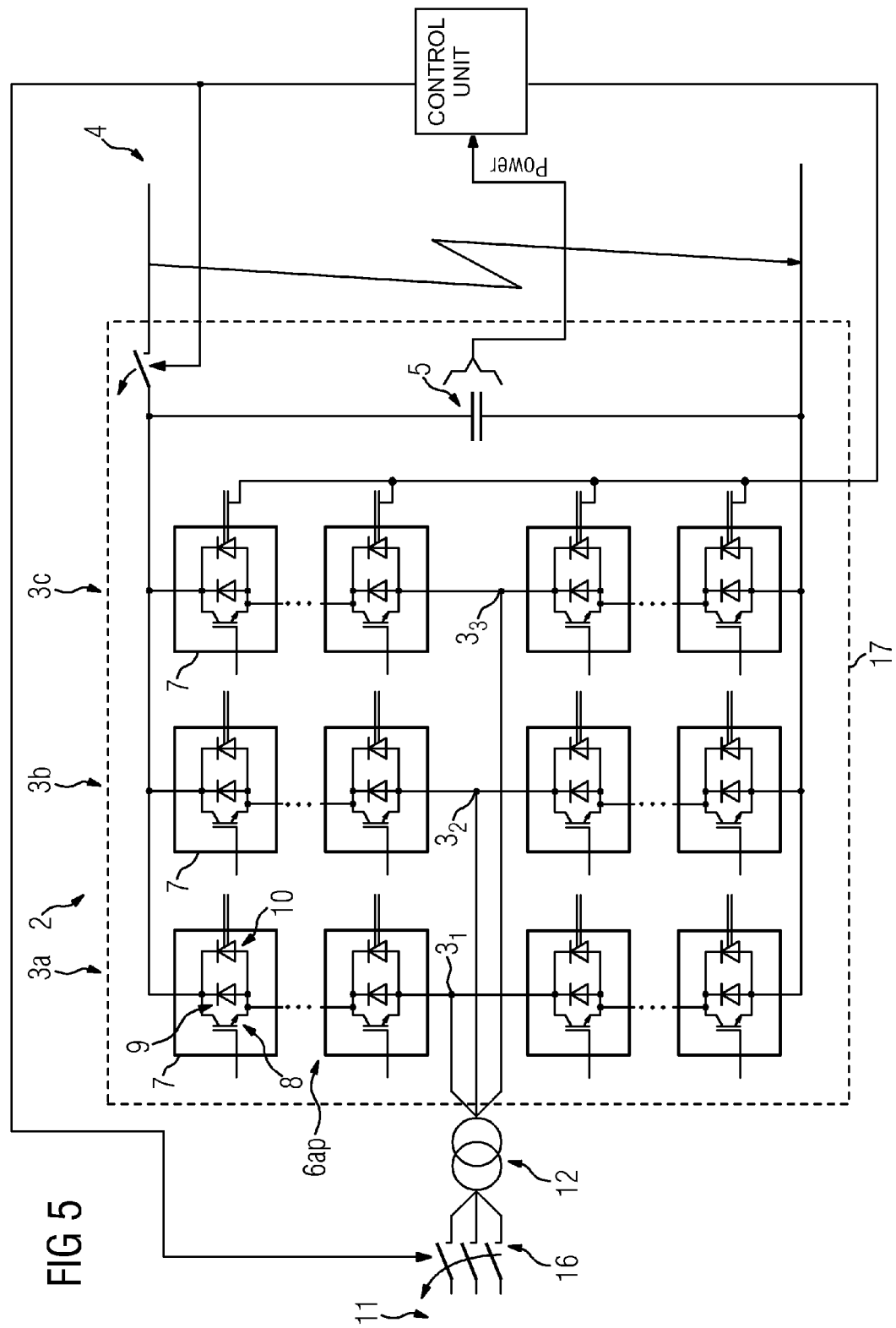
FIG. 5 shows the device in accordance with FIG. 3 in a different switch position.

FIG. 5 shows the device in accordance with FIG. 3, but the AC voltage switch 16 has been transferred to its disconnected position. This is effected for example when the capacitor 5 has been charged with energy to such an extent that triggering of the thyristor 10 in the case of a fault, that is to say in the case of a short circuit in the DC voltage intermediate circuit 4, is made possible.

Figure 6:
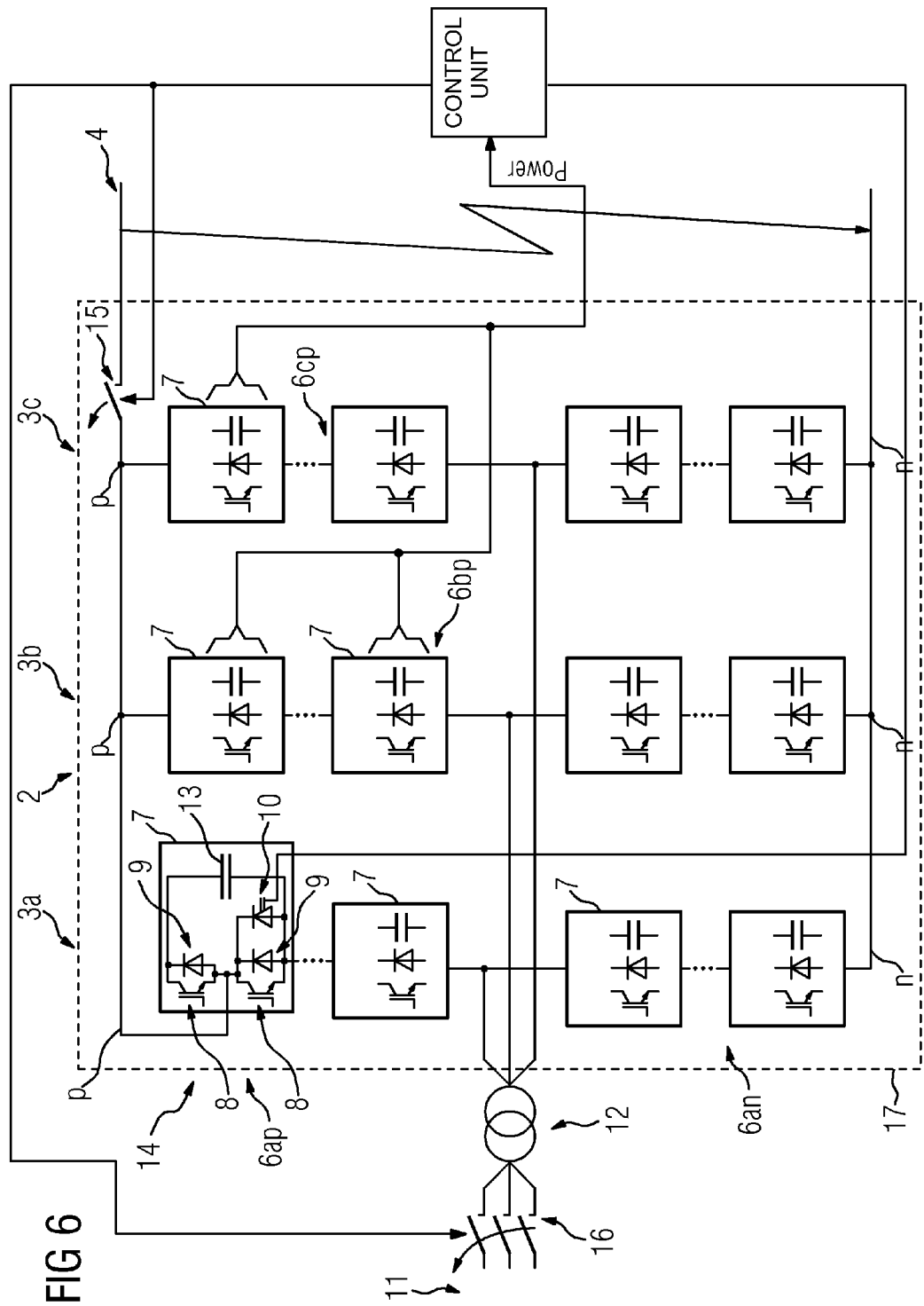
FIG. 6 shows the device in accordance with FIG. 4 in a different switch position.

FIG. 6 shows the exemplary embodiment in accordance with FIG. 2, the AC voltage switch 16 likewise having been transferred to its disconnected position. Here, too, the AC voltage switch 16 is transferred to its disconnected position only when the capacitors 13 of the submodules 7 have been sufficiently charged in order to be able to trigger the respective thyristor 10 as semiconductor protective means.

Figure 7:
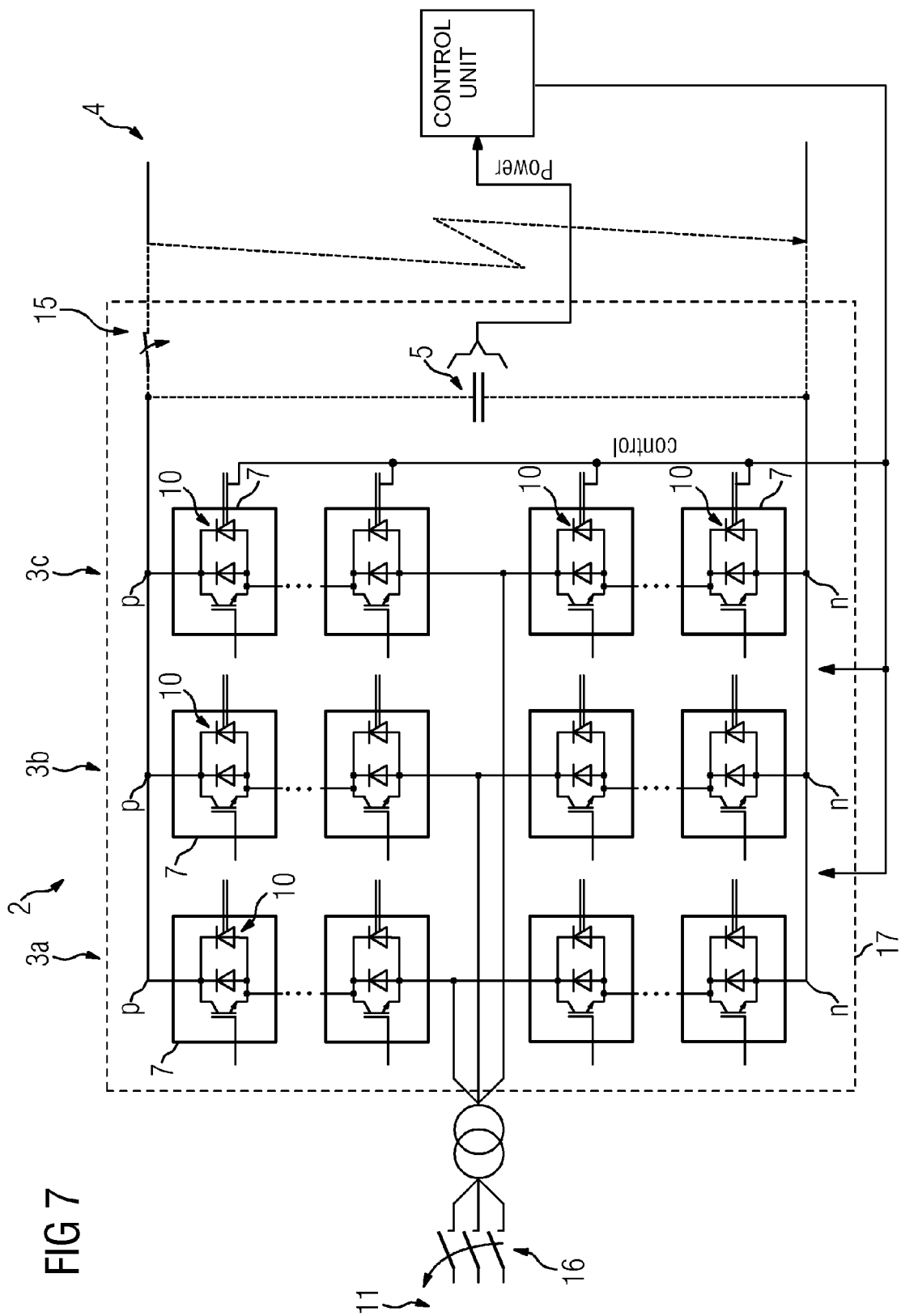
FIG. 7 shows the device in accordance with FIGS. 3 and 5 in a different switch position.

FIG. 7 shows the device in accordance with FIG. 5, but the DC voltage switch 15 has been transferred to its contact position. On account of the short circuit in the DC voltage intermediate circuit 4, the central capacitor 5 connected into the DC voltage intermediate circuit 4 in parallel is discharged. In this case, once again high short-circuit currents flow, which allow a conclusion to be drawn about a short circuit in the DC voltage intermediate circuit 4 on the basis of suitable current measurement. In other words, the short circuit in the DC voltage intermediate circuit 4 is identified on the basis of the high discharge currents of the capacitor 5, such that suitable measures can be implemented.

In the case of multilevel topology in accordance with FIG. 8, with the same switch position as in FIG. 7, that is to say with DC voltage switch 15 closed and AC voltage switch 16 open, the capacitors 13 are not discharged since the freewheeling diodes 9 of the submodules 7 prevent them from being discharged.

FIG. 9 shows the exemplary embodiment in accordance with FIG. 8, but the AC voltage switch 16 has been transferred to its contact position. On account of the short circuit in the DC voltage intermediate circuit 4, a short-circuit current fed from the supply system 11 flows, said current having been identified within a few microseconds by a suitable electronic detection unit or other detection device, which subsequently triggers the thyristor 10. In this case, the necessary triggering energy is provided by the previously charged capacitors 13 of the submodules 7. The short-circuit current, which is again illustrated by dashed lines in FIG. 10, thus passes via the freewheeling diode 9 and simultaneously via the thyristor 10 connected in parallel. The thyristor 10 has a sufficiently high surge current-carrying capacity in order to withstand the high current surge (di/dt). The current-carrying capacity of the freewheeling diode 9 and the thyristor 10 connected in parallel is also high enough that the expected short-circuit currents do not lead to the destruction of the power semiconductors.

An exemplary embodiment of the method according to the invention is described below. Firstly, the entire device 1 is disconnected from the supply system 11. Both the AC voltage switch 16 and the DC voltage switch 15 are transferred to their disconnected positions. With DC voltage switch 15 still open, the AC voltage switch 16 is closed. On account of the open DC voltage switch 15, a possible short circuit in the DC voltage intermediate circuit 4 does not lead to a short-circuit current fed from the supply system 11 in the converter 2. On account of the closed AC voltage switch 16, however, the energy stores in the converter or in the DC voltage intermediate circuit 4 are charged by the supply system 11. The semiconductor protective means, that is to say the thyristors 10, can thus be driven over a certain time duration. Said time duration is in the minutes range in practice, since the discharging of the capacitors is associated with a corresponding time constant. After the charging of the energy stores 5, 13 by the supply system 11, the AC voltage switch 16 is opened again and the converter is thus disconnected from the supply system 11. With charged energy stores 5, 13 and with AC voltage switch 16 open, the DC voltage switch 15 is closed. In the case of a short circuit, with a central intermediate circuit capacitor 5, the latter is discharged via the DC voltage switch 15, whereby the fault can be identified. On account of the high discharge currents, the DC voltage switch 15, if it is advantageously embodied as a disconnecting switch, is damaged or destroyed. In the case of a multilevel converter topology with capacitances distributed between the submodules 7, the charge in the capacitors is maintained when the DC voltage intermediate circuit 4 is connected in, since the freewheeling diodes 9 do not permit any discharging. The DC voltage switch 15 thus switches without voltage and current, with the result that damage to the DC voltage switch 15 is avoided. Finally, the AC voltage switch 16 is closed. In the case of an intermediate voltage circuit 4 affected by a short circuit, the short-circuit currents driven by the supply system 11 flow through the submodules 7. These are identified rapidly, that is to say in the range of microseconds, on the basis of a suitable current measurement, whereupon a triggering signal for triggering the semiconductor protective means, that is to say the thyristors 10, is transmitted. By virtue of the precharged energy stores 5, 13, the driving can initiate a triggering of the thyristors 10 and thus protect the parallel power semiconductors 8, 9.

The DC voltage switch 15 is expediently a simple disconnecting switch. The AC voltage switch 16 is a circuit-breaker, however. Circuit-breakers can be transferred to their disconnected position even in the case of currents driven by a voltage, an arc that arises being extinguished. In other words, circuit-breakers are able to switch even high powers effectively. By contrast, disconnecting switches are provided for currentless opening, with arcing being avoided. Disconnecting switches can therefore be obtained significantly more cost-effectively.

The invention claimed is:

1. A method for limiting damage to a converter having power semiconductors, the converter being connected to at least one further converter or at least one machine via a DC voltage intermediate circuit affected by a short circuit, wherein a drive unit is supplied with energy by an energy store of the converter or of the DC voltage intermediate circuit, which comprises the steps of:
    ascertaining, via the drive unit, a short circuit and subsequently driving at least one semiconductor protective device connected in parallel with a power semiconductor, such that a short-circuit current flows both via the semiconductor protective device and via the power semiconductor connected in parallel therewith;
    charging the energy store before the converter is connected to the DC voltage intermediate circuit;
    connecting the power semiconductor to the DC voltage intermediate circuit by means of a DC voltage switch;
    opening the DC voltage switch before the converter is connected to a supply system;
    connecting the converter to the supply system by means of AC voltage switches;
    in order to connect the converter to the DC voltage intermediate circuit, first opening all the AC voltage switches and the DC voltage switch; and
    afterward, in order to charge the energy stores, closing the AC voltage switches, each of the AC voltage switches is opened after charging of the energy stores, the DC voltage switch is closed for connecting the converter to the DC voltage intermediate circuit, and, finally, each of the AC voltage switches is closed to connect the converter to the supply system provided that no DC short circuit was able to be detected beforehand.

* * * * *